US012597876B2

(12) United States Patent
Suzuki

(10) Patent No.: US 12,597,876 B2
(45) Date of Patent: Apr. 7, 2026

(54) POWER CONVERTER

(71) Applicant: KABUSHIKI KAISHA TOYOTA JIDOSHOKKI, Aichi-ken (JP)

(72) Inventor: Takahiro Suzuki, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 260 days.

(21) Appl. No.: 18/613,672

(22) Filed: Mar. 22, 2024

(65) Prior Publication Data

US 2024/0333189 A1      Oct. 3, 2024

(30) Foreign Application Priority Data

Mar. 29, 2023     (JP) ................................. 2023-053390

(51) Int. Cl.
*H02P 27/06*          (2006.01)
*H02J 7/00*           (2026.01)
*H02J 7/02*           (2016.01)

(52) U.S. Cl.
CPC ............ *H02P 27/06* (2013.01); *H02J 7/0063* (2013.01); *H02J 7/02* (2013.01)

(58) Field of Classification Search
CPC ...... H02P 27/06; H02P 25/184; H02J 7/0063; H02J 7/02; H02J 7/06; H02J 7/0068; H02J 7/007; B60L 53/22; H02H 7/16; H02H 9/02; H02M 1/0003; H02M 1/088; H02M 3/33573; H02M 7/53871

USPC ...................... 318/139, 400.26, 400.01, 700
See application file for complete search history.

(56) References Cited

U.S. PATENT DOCUMENTS 10,756,629 B2 *   8/2020   Ishikawa ................... H02P 3/18

FOREIGN PATENT DOCUMENTS

JP          2010-259274 A      11/2010

* cited by examiner

*Primary Examiner* — David Luo
(74) *Attorney, Agent, or Firm* — Greenblum & Bernstein, P.L.C.

(57)          ABSTRACT

A power converter includes a charger, a battery, a motor, an inrush current limiter, and processing circuitry. A first switching unit connects the charger to the battery. A second switching unit connects a positive conductor to the neutral point of the motor. A third switching unit connects the battery and the inverter. The inrush current limiter is connected in parallel to the third switching unit and includes a resistance element and a fourth switching unit. The controller pre-charges a second capacitor arranged between the battery and the inverter by turning off the third switching unit and turning on the fourth switching unit. The controller pre-charges a first capacitor arranged between the charger and the battery after pre-charging the second capacitor by performing a step-down operation with the inverter while turning on the second and third switching units and turning off the first and fourth switching units.

1 Claim, 4 Drawing Sheets

POWER CONVERTER

BACKGROUND

Field

The following description relates to a power converter.

Description of Related Art

Japanese Laid-Open Patent Publication No. 2010-259274 discloses a power converter that includes an inverter, an input capacitor, a relay, an inrush current limiter, and a charger. The inverter converts direct current (DC) power received from a battery into alternating current (AC) power and outputs the AC power. The input capacitor is located between the battery and the inverter. The relay is arranged in an interconnection connecting the battery and the inverter. The inrush current limiter includes a switch and a resistance element. The switch and the resistance element are connected in series to each other. The inrush current limiter is connected in parallel to the relay. When activating the inverter, the switch is turned on to pre-charge the input capacitor via the resistance element. This allows the inrush current limiter to limit inrush current. The charger converts AC power received from an external AC power supply into DC power and outputs the DC power. The battery is charged with the DC power output from the charger.

When charging the battery with the charger, current also flows through a capacitor of the charging device. To limit inrush current when charging the battery with the charger, the capacitor of the charger should also be provided with an inrush current limiter. In this case, separate inrush current limiters will have to be provided for the input capacitor and for the capacitor of the charger. This may enlarge the power conversion device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power converter includes a charger, a battery, a first capacitor, an inverter, a second capacitor, a motor, a positive conductor, a negative conductor, a first switching unit, a connection line, a second switching unit, an interconnection, a third switching unit, an inrush current limiter, and processing circuitry. The charger is configured to convert input alternating current (AC) power into direct current (DC) power. The battery is configured to be supplied with DC power that is output from the charger. The first capacitor is arranged between the charger and the battery. The inverter is configured to be supplied with DC power that is output from the battery. The second capacitor is arranged between the battery and the inverter. The motor includes three star-connected coils and is configured to be supplied with AC power that is output from the inverter. The positive conductor is configured to connect the charger to a positive electrode of the battery. The negative conductor is configured to connect the charger to a negative electrode of the battery. The first switching unit is arranged in the positive conductor and configured to be turned on to connect the charger to the battery and turned off to disconnect the charger from the battery. The connection line is configured to connect a node between the charger and the first switching unit in the positive conductor to a neutral point of the motor. The second switching unit is arranged in the connection line and configured to be turned on to connect the positive conductor to the neutral point of the motor and turned off to disconnect the positive conductor from the neutral point of the motor. The interconnection is configured to connect the battery to the second capacitor. The third switching unit is arranged in the interconnection and configured to be turned on to connect the battery to the second capacitor and turned off to disconnect the battery from the second capacitor. The inrush current limiter is connected in parallel to the third switching unit and includes a resistance element and a fourth switching unit that is configured to be turned on to connect the battery via the resistance element to the second capacitor and turned off to disconnect the battery from the second capacitor. The processing circuitry is configured to pre-charge the second capacitor by turning off the third switching unit and turning on the fourth switching unit. Further, the processing circuitry is configured to pre-charge the first capacitor after pre-charging the second capacitor by performing a step-down operation with the inverter while turning on the second switching unit and the third switching unit and turning off the first switching unit and the fourth switching unit.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of a power converter will now be described. In this example, the power converter is installed in a vehicle.

Power Converter

Figure 1:
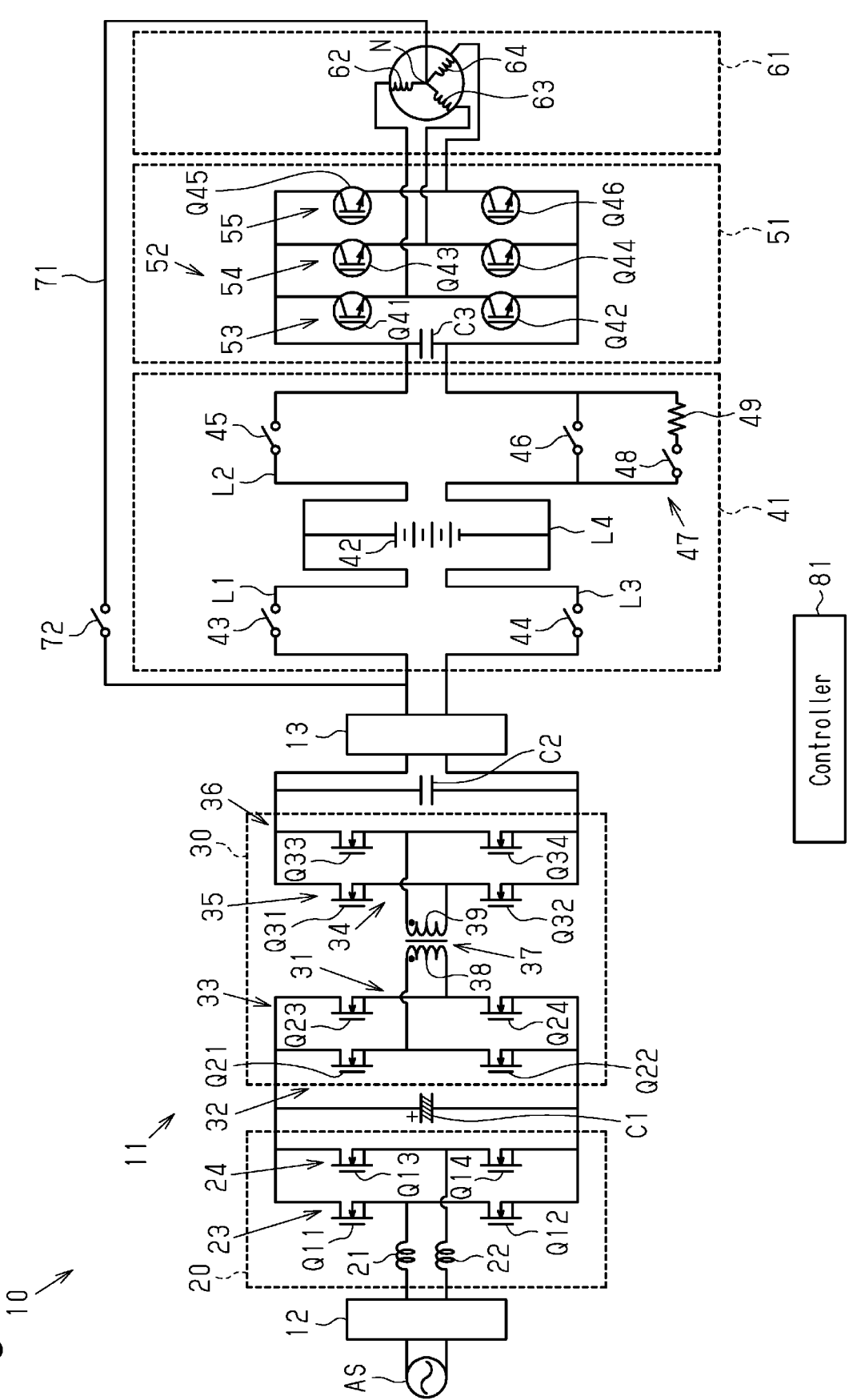
FIG. 1 is a circuit diagram of a power converter.

As shown in FIG. 1, a power converter 10 includes a charger 11, an AC filter 12, a first capacitor C2, a DC filter 13, a battery pack 41, an inverter circuit 51, and a motor 61. The inverter circuit 51 includes an inverter 52 and a second capacitor C3.

The charger 11 converts input alternating current (AC) power into direct current (DC) power. The charger 11 of this embodiment includes an AC/DC converter 20, a capacitor C1, and a DC/DC converter 30.

An external AC power supply AS, which is located outside a vehicle, supplies AC power that is input to the charger 11. The input AC power from the external AC power supply AS may be three-phase AC or single-phase AC.

The AC filter 12 reduces noise emitted from the external AC power supply AS.

The AC/DC converter 20 includes two reactors 21 and 22 and two series-connected bodies 23 and 24. A first end of the reactor 21 and a first end of the reactor 22 are connected to the AC filter 12. This connects the reactors 21 and 22 via the AC filter 12 to the external AC power supply AS.

The two series-connected bodies 23 and 24 are connected in parallel to each other. The series-connected body 23 includes two switching elements Q11 and Q12 that are connected in series to each other. A second terminal of the reactor 21 is connected to a node of the two switching elements Q11 and Q12. The switching elements Q11 and Q12 are, for example, semiconductor switching elements. A semiconductor switching element is, for example, a metal-oxide semiconductor field-effect transistor MOSFET), an insulated-gate bipolar transistor (IGBT), a gallium nitride high electron mobility transistor (Gan HEMT), or the like.

The series-connected body 24 includes two switching elements Q13 and Q14 that are connected in series to each other. A second terminal of the reactor 22 is connected to a node of the two switching elements Q13 and Q14. The switching elements Q13 and Q14 are, for example, semiconductor switching elements.

The AC/DC converter 20 improves the power factor, while converting the input AC power, which is received via the AC filter 12, into DC power.

The capacitor C1 is arranged between the AC/DC converter 20 and the DC/DC converter 30. The capacitor C1 is a link capacitor or a smoothing capacitor.

One end of the capacitor C1 is connected to a node of the switching elements Q11 and Q13.

The other end of the capacitor C1 is connected to a node of the two switching elements Q12 and Q14.

The series-connected bodies 23 and 24 are connected in parallel to the capacitor C1.

The DC/DC converter 30 includes a first bridge circuit 31, a second bridge circuit 34, and a transformer 37. The first bridge circuit 31 includes two series-connected bodies 32 and 33. The two series-connected bodies 32 and 33 are connected in parallel to each other. The series-connected body 32 includes two switching elements Q21 and Q22 that are connected in series to each other. The switching elements Q21 and Q22 are, for example, semiconductor switching elements.

The series-connected body 33 includes two switching elements Q23 and Q24 that are connected in series to each other. The switching elements Q23 and Q24 are, for example, semiconductor switching elements.

A node of the two switching elements Q21 and Q23 is connected to one end of the capacitor C1.

A node of the two switching elements Q22 and Q24 is connected to the other end of the capacitor C1.

The series-connected bodies 32 and 33 are connected in parallel to the capacitor C1.

The second bridge circuit 34 includes two series-connected bodies 35 and 36. The two series-connected bodies 35 and 36 are connected in parallel to each other. The series-connected body 35 includes two switching elements Q31 and Q32 that are connected in series to each other. The switching elements Q31 and Q32 are, for example, semiconductor switching elements.

The series-connected body 36 includes two switching elements Q33 and Q34. The switching elements Q33 and Q34 are, for example, semiconductor switching elements.

The transformer 37 includes a first winding 38 and a second winding 39. One end of the first winding 38 is connected to a node of the two switching elements Q21 and Q22. Another end of the first winding 38 is connected to a node of the two switching elements Q23 and Q24. One end of the second winding 39 is connected to a node of the two switching elements Q31 and Q32. The other end of the second winding 39 is connected to a node of the two switching elements Q33 and Q34.

The first capacitor C2 is a link capacitor or a smoothing capacitor.

One end of the first capacitor C2 is connected to a node of the two switching elements Q31 and Q33, and the other end of the first capacitor C2 is connected to a node of the two switching elements Q32 and Q34.

The series-connected bodies 35 and 36 are connected in parallel to the first capacitor C2.

The DC filter 13 is arranged between the series-connected body 36 and the battery pack 41. The DC filter 13 reduces noise included in the DC power output from the series-connected body 36 and outputs the DC power to the battery pack 41.

The battery pack 41 includes a battery 42, a first positive conductor L1, a second positive conductor L2, a first negative conductor L3, a second negative conductor L4, and first to fourth switches 43 to 46.

The battery 42 includes rechargeable batteries that can be charged and discharged. The positive electrode of the battery 42 is connected to the first positive conductor L1. The negative electrode of the battery 42 is connected to the first negative conductor L3. The first capacitor C2 is arranged between the charger 11 and the battery 42.

The first positive conductor L1 serves as a positive conductor configured to connect the charger 11 to the positive electrode of the battery 42. The first negative conductor L3 serves as a negative conductor configured to connect the charger 11 to the negative electrode of the battery 42. In this embodiment, the first positive conductor L1 and the first negative conductor L3 connect the DC filter 13 and the battery 42. The battery 42 is supplied with the DC power output from the charger 11.

The first switch 43 is arranged in the first positive conductor L1. The first switch 43 is, for example, a relay switch. The first switch 43, which is arranged in the first positive conductor L1, acts as a first switching unit that is switchable to connect or disconnect the charger 11 and the battery 42. The first switch 43 is turned on to connect the charger 11 to the battery 42 and turned off to disconnect the charger 11 from the battery 42.

The second switch 44 is arranged in the first negative conductor L3. The second switch 44 is, for example, a relay switch. The second switch 44 is switchable to connect or disconnect the charger 11 and the battery 42. The second switch 44 is turned on to connect the charger 11 to the battery 42 and turned off to disconnect the charger 11 from the battery 42.

The second positive conductor L2 connects the positive electrode of the battery 42 and the inverter 52. The second negative conductor L4 connects the negative electrode of the battery 42 and the inverter 52.

The third switch 45 is arranged in the second positive conductor L2. The third switch 45 is, for example, a relay switch. The third switch 45 is switchable to connect or disconnect the battery 42 and the inverter 52. The third switch 45 is turned on to connect the battery 42 to the inverter 52 and turned off to disconnect the battery 42 from the inverter 52.

The fourth switch 46 is arranged in the second negative conductor L4. The fourth switch 46 is, for example, a relay switch. The fourth switch 46 is switchable to connect or disconnect the battery 42 and the inverter 52. The fourth switch 46 is turned on to connect the battery 42 to the inverter 52 and turned off to disconnect the battery 42 from the inverter 52.

The inverter 52 is a three-phase inverter. The inverter 52 includes three series-connected bodies 53, 54, and 55. The series-connected bodies 53, 54, and 55 are connected in parallel to one another. The series-connected body 53 includes a U-phase upper-arm switching element Q41 and a U-phase lower-arm switching element Q42. The U-phase upper-arm switching element Q41 and the U-phase lower-arm switching element Q42 are connected in series between the second positive conductor L2 and the second negative conductor L4. The series-connected body 54 includes a V-phase upper-arm switching element Q43 and a V-phase lower-arm switching element Q44. The V-phase upper-arm switching element Q43 and the V-phase lower-arm switching element Q44 are connected in series between the second positive conductor L2 and the second negative conductor L4. The series-connected body 55 includes a W-phase upper-arm switching element Q45 and a W-phase lower-arm switching element Q46. The W-phase upper-arm switching element Q45 and the W-phase lower-arm switching element Q46 are connected in series between the second positive conductor L2 and the second negative conductor L4. The U-phase upper-arm switching element Q41, the U-phase lower-arm switching element Q42, the V-phase upper-arm switching element Q43, the V-phase lower-arm switching element Q44, the W-phase upper-arm switching element Q45, and the W-phase lower-arm switching element Q46 are, for example, semiconductor switching elements. The inverter 52 is connected by the second positive conductor L2 and the second negative conductor L4 to the battery 42.

The second capacitor C3 is arranged between the battery 42 and the inverter 52. The second capacitor C3 has one end connected to the second positive conductor L2 and another end connected to the second negative conductor L4. The second capacitor C3 is a smoothing capacitor or a link capacitor.

The motor 61 is a three-phase motor. The motor 61 includes three coils 62, 63, and 64. The three coils 62, 63, and 64 are star-connected. A first end of the coil 62 is connected to a node of the U-phase upper-arm switching element Q41 and the U-phase lower-arm switching element Q42. A first end of the coil 63 is connected to a node of the V-phase upper-arm switching element Q43 and the V-phase lower-arm switching element Q44. A first end of the coil 64 is connected to a node of the W-phase upper-arm switching element Q45 and the W-phase lower-arm switching element Q46. A second end of the coil 62, a second end of the coil

63, and a second end of the coil 64 are connected to one another. A node of the second end of the coil 62, the second end of the coil 63, and the second end of the coil 64 is a neutral point N of the motor 61.

The power converter 10 includes a connection line 71. The connection line 71 connects a node between the charger 11 and the first switch 43 in the first positive conductor L1 to the neutral point N of the motor 61.

The power converter 10 includes a second switching unit 72. The second switching unit 72 is arranged in the connection line 71 to connect or disconnect the first positive conductor L1 and the neutral point N of the motor 61. The second switching unit 72 is, for example, a relay switch. The second switching unit 72 is turned on to connect the first positive conductor L1 to the neutral point N of the motor 61 and turned off to disconnect the first positive conductor L1 from the neutral point N of the motor 61.

The second positive conductor L2 and the second negative conductor L4 connect the battery 42 and the second capacitor C3. The second negative conductor L4 is an interconnection connecting the battery 42 and the second capacitor C3. The fourth switch 46 acts as a third switching unit that is switchable to connect or disconnect the battery 42 and the second capacitor C3. The fourth switch 46 is turned on to connect the battery 42 to the second capacitor C3 and turned off to disconnect the battery 42 from the second capacitor C3.

The battery pack 41 includes an inrush current limiter 47. The inrush current limiter 47 is connected in parallel to the fourth switch 46. The inrush current limiter 47 includes a resistance element 49 and a fourth switching unit 48. The fourth switching unit 48 and the resistance element 49 are connected in series to each other. The fourth switching unit 48 is switchable to connect or disconnect the battery 42 and the second capacitor C3 via the resistance element 49. The fourth switching unit 48 is turned on to connect the battery 42 to the second capacitor C3 via the resistance element 49 and turned off to disconnect the battery 42 from the second capacitor C3.

The power converter 10 includes a controller 81. The controller 81 includes a processor and storage. Examples of the processor include a central processing unit (CPU), a graphics processing unit (GPU), and a digital signal processor (DSP). The storage includes a random-access memory (RAM) and a read-only memory (ROM). The storage stores program codes or instructions configured to have the processor execute a process. The storage, or a computer readable medium, includes any type of medium that is accessible by a general-purpose computer or a dedicated computer. The controller may include a hardware circuit such as an application specific integrated circuit (ASIC) or a field programmable gate array (FPGA). The controller, which acts as processing circuitry, may include one or more processors that run on computer programs, one or more hardware circuits such as an ASIC and an FPGA, or a combination of such devices.

The controller 81 controls the power converter 10. In this embodiment, the controller 81 totally controls the power converter 10. The power converter 10 may be controlled by more than one controller. For example, the power converter 10 may include a controller that controls the charger 11, a controller that controls the DC/DC converter 30, a controller that controls the battery pack 41, and a controller that controls the inverter 52.

Pre-Charge Control Executed by Controller During Battery Charging

The controller 81 executes pre-charge control when the battery 42 is charged. Pre-charge control is executed when, for example, the charger 11 and the external AC power supply AS are connected. Connection of the charger 11 and the external AC power supply AS is detected when, for example, the controller 81 detects that a charge plug has been connected to the vehicle.

Figure 2:
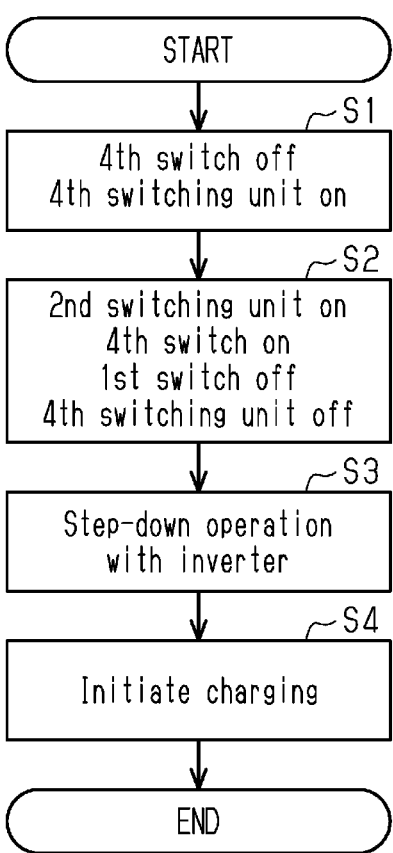
FIG. 2 is a flowchart illustrating pre-charge control executed by a controller shown in FIG. 1.
Figure 3:
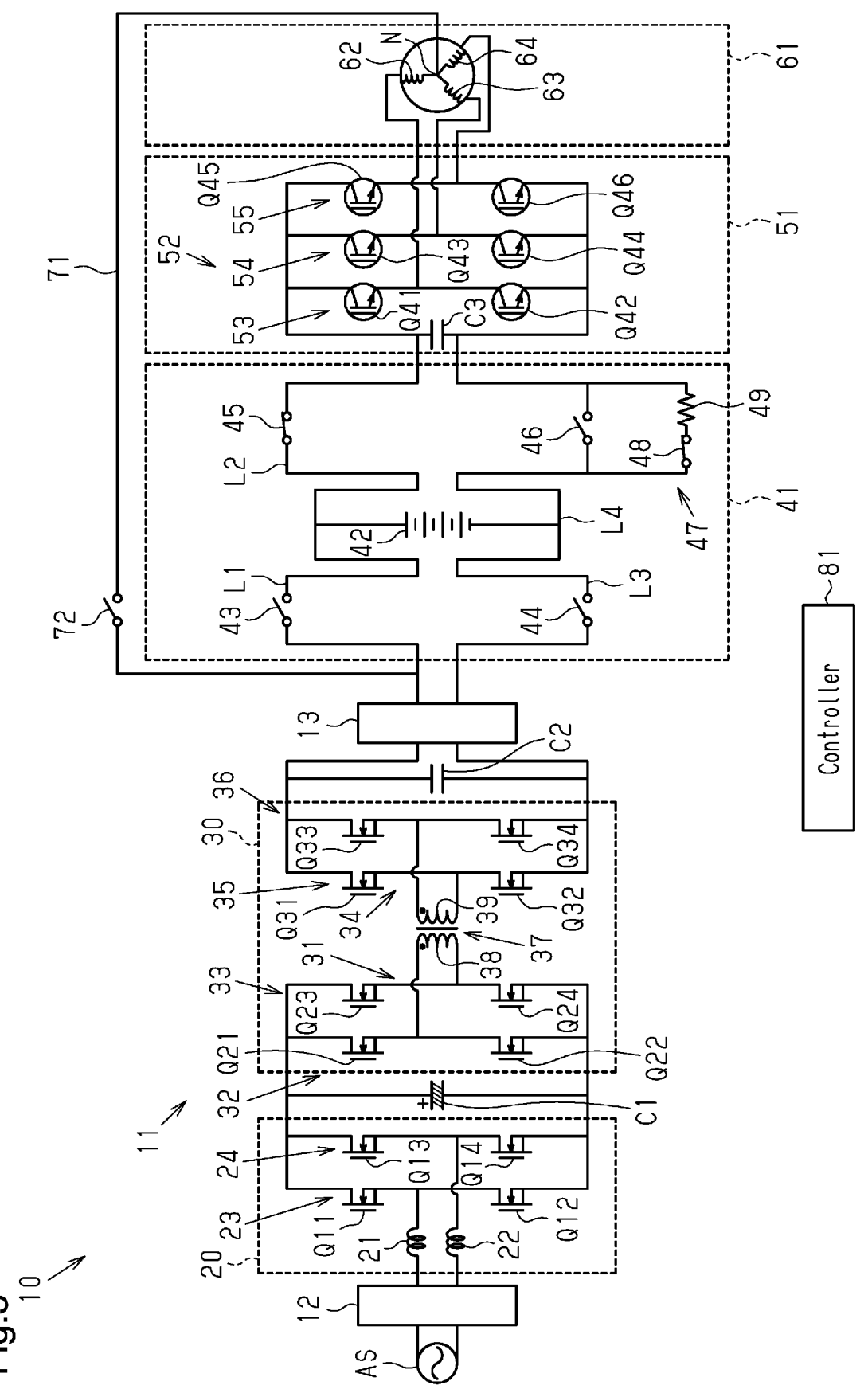
FIG. 3 is a circuit diagram of the power converter when pre-charging a second capacitor through the pre-charge control illustrated in FIG. 2.

As shown in FIGS. 2 and 3, in step S1, the controller 81 turns off the fourth switch 46. Further, the controller 81 turns on the fourth switching unit 48. The first switch 43, the second switch 44, and the second switching unit 72 are turned off. The third switch 45 is turned on. Consequently, current flows from the battery 42 to the second capacitor C3 and pre-charges the second capacitor C3.

Figure 4:
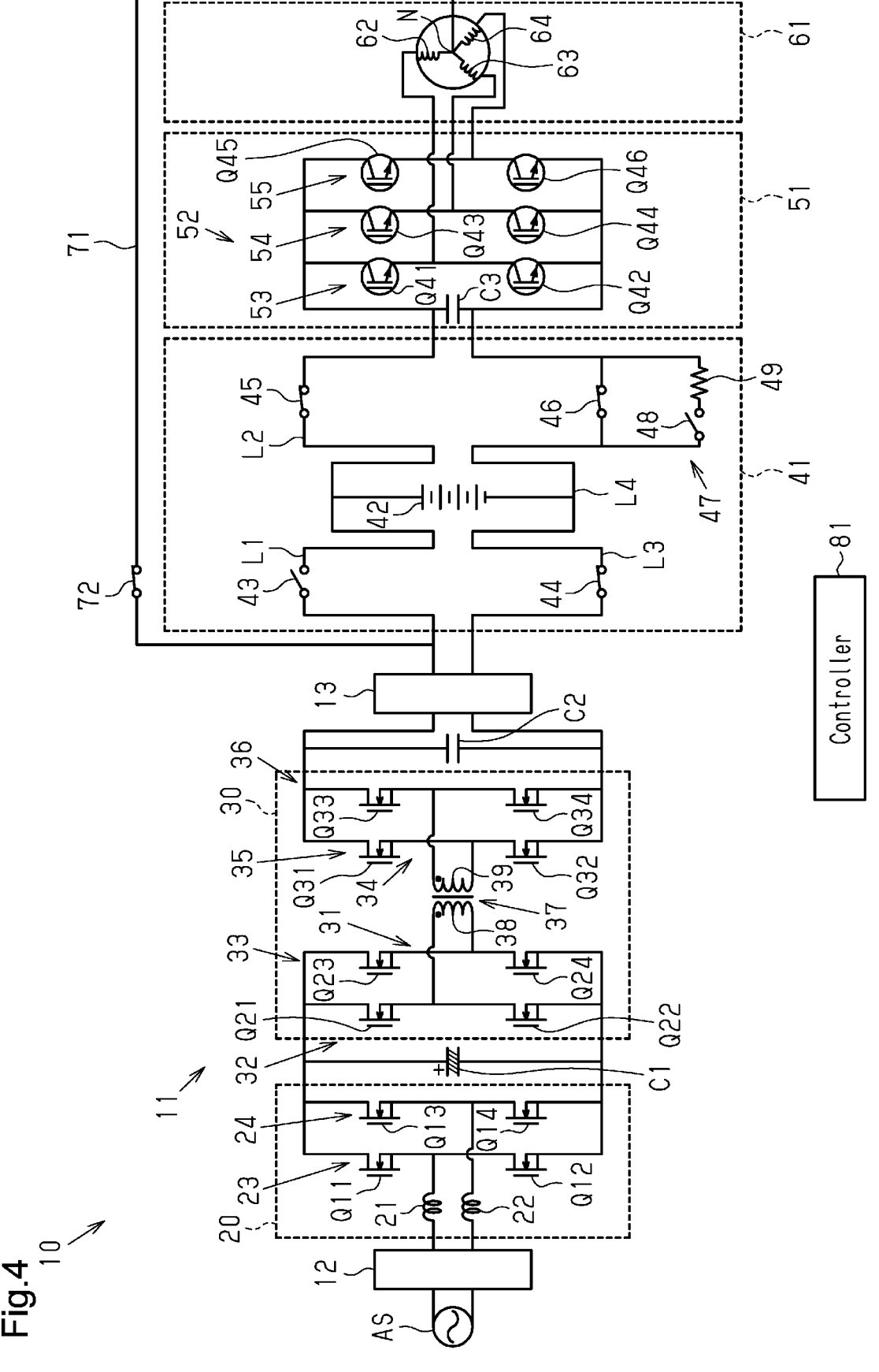
FIG. 4 is a circuit diagram of the power converter when pre-charging a first capacitor through the pre-charge control illustrated in FIG. 2.

Then, as shown in FIGS. 2 and 4, in step S2, the controller 81 turns on the second switching unit 72. The controller 81 turns on the fourth switch 46. The controller 81 turns off the first switch 43. The controller 81 turns off the fourth switching unit 48. The second switch 44 and the third switch 45 are turned on.

In step S3, the controller 81 performs a step-down operation with the inverter 52. For example, the controller 81 turns on the upper-arm switching elements Q41, Q43, and Q45 in a state where the lower-arm switching elements Q42, Q44, and Q46 are turned off to accumulate electromagnetic energy in the coils 62, 63, and 64. Then, the controller 81 turns off the upper-arm switching elements Q41, Q43, and Q45 to release the electromagnetic energy from the coils 62, 63, and 64. The step-down operation of the inverter 52 is performed in this manner. The step-down operation of the inverter 52 may be performed with only one of the V-phase, the U-phase, and the W-phase. The DC voltage of the battery 42 at the input of the inverter 52 is decreased by the step-down operation of the inverter 52. The DC voltage at the output of the inverter 52 results in the flow of current through the connection line 71 to the first capacitor C2. This pre-charges the first capacitor C2.

Then, in step S4, the controller 81 initiates charging of the battery 42. The controller 81 controls the AC/DC converter 20 so that the AC/DC converter 20 outputs DC voltage. This charges the battery 42. Under this situation, the first switch 43 is on, the second switch 44 is on, the third switch 45 is off, the fourth switch 46 is off, the fourth switching unit 48 is off, and the second switching unit 72 is off.

Operation of Embodiment

The controller 81 turns off the fourth switch 46 and turns on the fourth switching unit 48 so that current flows via the resistance element 49 to the second capacitor C3. The flow of current via the resistance element 49 gradually pre-charges the second capacitor C3. Further, the controller 81 performs a step-down operation with the inverter 52 in a state where the second switching unit 72 and the fourth switch 46 are turned on and the first switch 43 and the fourth switching unit 48 are turned off so that current flows to the first capacitor C2. The controller 81 performs a step-down operation with the inverter 52 to gradually pre-charge the first capacitor C2.

Advantages of Embodiment (1) The controller 81 turns off the fourth switch 46 and turns on the fourth switching unit 48 to pre-charge the second capacitor C3. The controller 81 performs a step-down operation with the inverter 52 in a state where the second switching unit 72 and the fourth switch 46 are on and the first switch 43 and the fourth switching unit 48 are off to pre-charge the first capacitor C2. Thus, the first capacitor C2 does not have to be provided with an inrush current limiter. This avoids enlargement of the power converter 10 that would occur when the second capacitor C3 and the first capacitor C2 are each provided with a separate inrush current limiter. Further, the costs for manufacturing the power converter 10 are lower than when the second capacitor C3 and the first capacitor C2 are each provided with a separate inrush current limiter.

Modified Examples

The above embodiment may be modified as described below. The above embodiment and the following modifications can be combined as long as there is no technical contradiction.

The battery pack 41 of the above embodiment does not have to include the second switch 44.

The battery pack 41 of the above embodiment does not have to include the third switch 45.

The charger 11 may have any structure as long as it converts the input AC power to DC power.

The DC/DC converter 30 of the above embodiment may have any structure as long as it transfers DC power from the first bridge circuit 31 to the second bridge circuit 34.

The motor 61 of the above embodiment may be used in a motor-driven compressor. The inverter 52 may be used to drive a motor of a motor-driven compressor.

The inrush current limiter 47 of the above embodiment may be connected in parallel to the third switch 45. In this case, the second positive conductor L2 is an interconnection connecting the battery 42 and the inverter 52. The third switch 45 may act as the third switching unit.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A power converter, comprising:
   a charger configured to convert input alternating current (AC) power into direct current (DC) power;
   a battery configured to be supplied with DC power that is output from the charger;
   a first capacitor arranged between the charger and the battery;
   an inverter configured to be supplied with DC power that is output from the battery;
   a second capacitor arranged between the battery and the inverter;
   a motor including three star-connected coils and configured to be supplied with AC power that is output from the inverter;

a positive conductor configured to connect the charger to a positive electrode of the battery;

a negative conductor configured to connect the charger to a negative electrode of the battery;

a first switching unit arranged in the positive conductor and configured to be turned on to connect the charger to the battery and turned off to disconnect the charger from the battery;

a connection line configured to connect a node between the charger and the first switching unit in the positive conductor to a neutral point of the motor;

a second switching unit arranged in the connection line and configured to be turned on to connect the positive conductor to the neutral point of the motor and turned off to disconnect the positive conductor from the neutral point of the motor;

an interconnection configured to connect the battery to the second capacitor;

a third switching unit arranged in the interconnection and configured to be turned on to connect the battery to the second capacitor and turned off to disconnect the battery from the second capacitor;

an inrush current limiter connected in parallel to the third switching unit and including a resistance element and a fourth switching unit that is configured to be turned on to connect the battery via the resistance element to the second capacitor and turned off to disconnect the battery from the second capacitor; and processing circuitry, wherein the processing circuitry is configured to pre-charge the second capacitor by turning off the third switching unit and turning on the fourth switching unit, and the processing circuitry is configured to pre-charge the first capacitor after pre-charging the second capacitor by performing a step-down operation with the inverter while turning on the second switching unit and the third switching unit and turning off the first switching unit and the fourth switching unit.

* * * * *